United States Patent
Kanumalli et al.

(10) Patent No.: US 10,230,421 B2
(45) Date of Patent: Mar. 12, 2019

(54) RECEIVER AND A METHOD FOR REDUCING A DISTORTION COMPONENT WITHIN A BASEBAND RECEIVE SIGNAL

(71) Applicant: Intel IP Corporation, Santa Clara, CA (US)

(72) Inventors: Ram Kanumalli, Linz (AT); Andreas Mayer, Gramastetten (AT); Werner Schelmbauer, Steyr (AT); Ahmed S. Elmaghraby, Neubiberg (DE); Burkhard Neurauter, Linz (AT)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 15/575,867

(22) PCT Filed: Jun. 8, 2016

(86) PCT No.: PCT/IB2016/053360
§ 371 (c)(1),
(2) Date: Nov. 21, 2017

(87) PCT Pub. No.: WO2016/207759
PCT Pub. Date: Dec. 29, 2016

(65) Prior Publication Data
US 2018/0159585 A1    Jun. 7, 2018

(30) Foreign Application Priority Data
Jun. 25, 2015 (DE) .................. 10 2015 110 273

(51) Int. Cl.
*H04B 1/10* (2006.01)
*H04B 1/525* (2015.01)
(Continued)

(52) U.S. Cl.
CPC ............. *H04B 1/525* (2013.01); *H04L 25/02* (2013.01); *H04L 27/12* (2013.01); *H04B 1/1027* (2013.01); *H04B 2001/0408* (2013.01)

(58) Field of Classification Search
CPC .................. H04B 1/525; H04B 1/1027; H04B 2001/0408; H04L 25/02; H04L 27/12
(Continued)

(56) References Cited

U.S. PATENT DOCUMENTS 5,852,630 A * 12/1998 Langberg ............ H04L 27/2647
375/219
6,675,004 B1   1/2004 Waylett
(Continued)

FOREIGN PATENT DOCUMENTS

DE    102012205974 A1   10/2012
EP    1324485 A2        7/2003

*Primary Examiner* — Helene Tayong
(74) *Attorney, Agent, or Firm* — 2SPL Patentanwaelte PartG mbB; Mani Arabi

(57) ABSTRACT

A method for reducing a distortion component within a baseband receive signal is provided. The baseband receive signal is derived from a radio frequency signal and the distortion component is related to an undesired signal component of the radio frequency signal. The method includes generating a first local oscillator signal having a frequency related to a frequency of the undesired signal component. Further the method includes generating an auxiliary baseband signal using the radio frequency signal and the first local oscillator signal. The method further includes generating a second local oscillator signal having a frequency related to a frequency of a desired signal component of the radio frequency signal. Further the method includes generating the baseband receive signal using the radio frequency signal and the second local oscillator signal. The method includes modifying the baseband receive signal based on the auxiliary baseband signal.

22 Claims, 8 Drawing Sheets

(51) Int. Cl.
   *H04L 25/02* (2006.01)
   *H04L 27/12* (2006.01)
   *H04B 1/04* (2006.01)
(58) Field of Classification Search
   USPC .......................................................... 375/346
   See application file for complete search history.

(56) References Cited

U.S. PATENT DOCUMENTS

| | | |
|---|---|---|
| 8,200,181 B1 | 6/2012 | Khlat et al. |
| 9,755,691 B2 * | 9/2017 | Kim ........................ H04B 1/525 |
| 2005/0107051 A1 | 5/2005 | Aparin et al. |
| 2009/0213770 A1 | 8/2009 | Mu |
| 2009/0233568 A1 | 9/2009 | Zhang et al. |
| 2013/0208770 A1 * | 8/2013 | Muhammad .......... H04L 27/368 375/219 |
| 2014/0169411 A1 * | 6/2014 | Aunkofer ............. H04B 1/1036 375/148 |
| 2015/0236878 A1 * | 8/2015 | Okuhata ............. H04L 25/0262 455/209 |
| 2015/0382049 A1 * | 12/2015 | Fujii .................... H04N 5/4401 348/706 |
| 2016/0285487 A1 * | 9/2016 | Noest ................... H04B 1/1027 |

* cited by examiner

RECEIVER AND A METHOD FOR REDUCING A DISTORTION COMPONENT WITHIN A BASEBAND RECEIVE SIGNAL

FIELD

Examples relate to mitigating distortions in a baseband receive signal which are related to undesired signal components in a received radio frequency signal. In particular, examples relate to a receiver and a method for reducing a distortion component within a baseband receive signal.

BACKGROUND

In communication devices where a transmit path and a receive path share the same antenna, an intermediate device (e.g. a duplexer) may be provided to connect the transmit path and the receive path to the antenna. For example, a duplexer may separate different frequency bands used for transmission and reception of radio frequency signals by means of frequency-selective filter elements. For example, a first frequency band may be used by the transmit path for transmitting radio frequency signals, whereas a second frequency band may be used by the receive path for receiving radio frequency signals. A distance between a frequency band for transmission and a frequency band for reception is called "duplex distance". For example, a duplex distance may be 30 MHz for Long Term Evolution (LTE) frequency band 17. In particular, the transmit path and the receive path may be operated simultaneously, i.e., in Frequency-Division Duplexing (FDD) mode.

A duplexer should provide an adequate rejection of signal components related to transmission within a frequency band for reception. However, when a transmission signal is provided to the duplexer, leakage to the frequency band used for signal reception may occur. Thus, an undesired leakage component may be caused in a receive signal and yield significant transmit power in the receive signal. Accordingly, a signal containing a desired receive signal component and the undesired leakage component related to a baseband transmit signal may be provided to a subsequent receiver which may even result with the desired receive signal component being unrecoverable. Apart from leakage, there may also be other processes causing undesired components in a receive signal provided to a receiver (e.g. a blocker signal).

InterModulation Distortions (IMD) may be generated by a mixer of the receiver receiving a signal having different frequency components. For example, unwanted signal components may be present within a baseband receive signal generated by a mixer resulting from the non-linearity of the same. Referring to the above example, signal components having a frequency related to the sum or the difference of frequencies of the desired receive signal component and the undesired leakage component input to the mixer may be present in the baseband receive signal generated by a mixer. In this event, the generated undesired signal components are referred to as second order IMD components. The second order IMD components may lower a Signal-to-Noise Ratio (SNR) of the baseband receive signal.

For Carrier Aggregation (CA), a receiver may comprise a single receive path for each component carrier and multiple clock domains may be used in the receiver (e.g. a dedicated local oscillator signal for a mixer of the respective receive path). Due to intermixing of frequencies from the multiple clock domains, a spur may occur at the mixer of a receive path. A spur is an undesired signal component occurring in addition to the dedicated local oscillator signal at an input of the mixer (e.g. due to crosstalk between the receive paths). Depending on the chosen carrier frequencies, the spur may have a frequency which is similar to a frequency of the undesired leakage component. Accordingly, the mixer may down-mix the undesired leakage component to the baseband due to the spur. The down-mixed leakage component may overlap with the down-mixed desired receive signal component and degrade the SNR of the baseband receive signal.

Conventional approaches attempt to mitigate the above described effects by suppressing the undesired leakage component before they can reach the mixer. In order to achieve this, a higher attenuation of the duplexer or separate flexible Surface Acoustic Wave (SAW) filters which filter out the undesired leakage component may be used. However, conventional approaches using analog technique require a large amount of space on a semiconductor substrate carrying the receiver. Also, the approach is not adapting to varying environmental conditions and aging of the used components so that the extent of improvement may end up being erratic. Furthermore, the (additional) high quality analog components increase manufacturing costs. Hence, there may be a desire for improved reduction of distortion components within a baseband receive signal

BRIEF DESCRIPTION OF THE FIGURES

Some examples of apparatuses and/or methods will be described in the following by way of example only, and with reference to the accompanying figures, in which.

DETAILED DESCRIPTION

Figure 1:
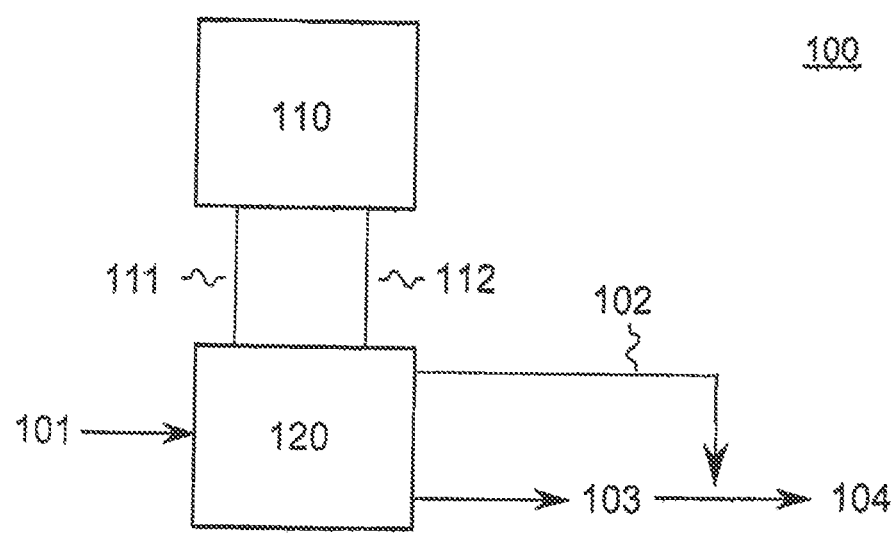
FIG. 1 illustrates an example of a receiver for reducing a distortion component within a baseband receive signal.

Various examples will now be described more fully with reference to the accompanying drawings in which some examples are illustrated. In the figures, the thicknesses of lines, layers and/or regions may be exaggerated for clarity.

Accordingly, while further examples are capable of various modifications and alternative forms, some examples thereof are shown by way of example in the figures and will herein be described in detail. It should be understood, however, that there is no intent to limit examples to the particular forms disclosed, but on the contrary, examples are to cover all modifications, equivalents, and alternatives falling within the scope of the disclosure. Like numbers refer to like or similar elements throughout the description of the figures.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular examples only and is not intended to be limiting of further examples. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Unless otherwise defined, all terms (including technical and scientific terms) used herein have the same meaning as commonly understood by one of ordinary skill in the art to which examples belong. It will be further understood that terms, e.g., those defined in commonly used dictionaries, should be interpreted as having a meaning that is consistent with their meaning in the context of the relevant art, unless expressly defined otherwise herein.

In the following, various examples relate to devices (e.g. cell phone, base station) or components (e.g. transmitter, transceiver) of devices used in wireless or mobile communications systems. A mobile communication system may, for example, correspond to one of the mobile communication systems standardized by the 3rd Generation Partnership Project (3GPP), e.g. Global System for Mobile Communications (GSM), Enhanced Data rates for GSM Evolution (EDGE), GSM EDGE Radio Access Network (GERAN), High Speed Packet Access (HSPA), Universal Terrestrial Radio Access Network (UTRAN) or Evolved UTRAN (E-UTRAN), Long Term Evolution (LTE) or LTE-Advanced (LTE-A), or mobile communication systems with different standards, e.g. Worldwide Interoperability for Microwave Access (WIMAX) IEEE 802.16 or Wireless Local Area Network (WLAN) IEEE 802.11, generally any system based on Time Division Multiple Access (TDMA), Frequency Division Multiple Access (FDMA), Orthogonal Frequency Division Multiple Access (OFDMA), Code Division Multiple Access (CDMA), etc. The terms mobile communication system and mobile communication network may be used synonymously.

The mobile communication system may comprise a plurality of transmission points or base station transceivers operable to communicate radio signals with a mobile transceiver. In some examples, the mobile communication system may comprise mobile transceivers, relay station transceivers and base station transceivers. The relay station transceivers and base station transceivers can be composed of one or more central units and one or more remote units.

A mobile transceiver or mobile device may correspond to a smartphone, a cell phone, User Equipment (UE), a laptop, a notebook, a personal computer, a Personal Digital Assistant (PDA), a Universal Serial Bus (USB)-stick, a tablet computer, a car, etc. A mobile transceiver or terminal may also be referred to as UE or user in line with the 3GPP terminology. A base station transceiver can be located in the fixed or stationary part of the network or system. A base station transceiver may correspond to a remote radio head, a transmission point, an access point, a macro cell, a small cell, a micro cell, a pico cell, a femto cell, a metro cell etc. The term small cell may refer to any cell smaller than a macro cell, i.e. a micro cell, a pico cell, a femto cell, or a metro cell. Moreover, a femto cell is considered smaller than a pico cell, which is considered smaller than a micro cell. A base station transceiver can be a wireless interface of a wired network, which enables transmission and reception of radio signals to a UE, mobile transceiver or relay transceiver. Such a radio signal may comply with radio signals as, for example, standardized by 3GPP or, generally, in line with one or more of the above listed systems. Thus, a base station transceiver may correspond to a NodeB, an eNodeB, a BTS, an access point, etc. A relay station transceiver may correspond to an intermediate network node in the communication path between a base station transceiver and a mobile station transceiver. A relay station transceiver may forward a signal received from a mobile transceiver to a base station transceiver, signals received from the base station transceiver to the mobile station transceiver, respectively.

The mobile communication system may be cellular. The term cell refers to a coverage area of radio services provided by a transmission point, a remote unit, a remote head, a remote radio head, a base station transceiver, relay transceiver or a NodeB, an eNodeB, respectively. The terms cell and base station transceiver may be used synonymously. In some examples a cell may correspond to a sector. For example, sectors can be achieved using sector antennas, which provide a characteristic for covering an angular section around a base station transceiver or remote unit. In some examples, a base station transceiver or remote unit may, for example, operate three or six cells covering sectors of 120° (in case of three cells), 60° (in case of six cells) respectively. Likewise a relay transceiver may establish one or more cells in its coverage area. A mobile transceiver can be registered or associated with at least one cell, i.e. it can be associated to a cell such that data can be exchanged between the network and the mobile in the coverage area of the associated cell using a dedicated channel, link or connection. A mobile transceiver may hence register or be associated with a relay station or base station transceiver directly or indirectly, where an indirect registration or association may be through one or more relay transceivers.

FIG. 1 illustrates an example of a receiver 100 for reducing a distortion component within a baseband receive signal 103 derived from a radio frequency signal 101, which is received by the receiver 100.

The radio frequency signal 101 comprises an undesired signal component (e.g. a blocker component or a leakage or crosstalk component caused by another signal) and a desired signal component (e.g. a desired downlink-component transmitted by a base-station). In some examples, the radio frequency signal 101 may comprise the undesired signal component and the desired signal component simultaneously. In some examples, the radio frequency signal 101 may comprise only the undesired signal component during a first time period, and both the undesired signal component and the desired signal component during a second time period, which is different from the second time period.

The receiver 100 comprises a local oscillator 110. The local oscillator 110 generates a first local oscillator signal 111 during the first time period. The first local oscillator signal 111 has a frequency which is related to a frequency of the undesired signal component. For example, if the undesired signal component is a modulated transmit signal, the frequency of the first local oscillator signal 111 may be equal or similar to a carrier frequency of the undesired signal component of the radio frequency signal 101.

A mixer 120 generates the auxiliary baseband signal 102 using the radio frequency signal 101 and the first local oscillator signal 111. For example, the mixer 120 may use the radio first local oscillator signal 111 to down-mix the radio frequency signal 101 to the auxiliary baseband signal 102. The auxiliary baseband signal 102 is related to the undesired signal component of the radio frequency signal 101 and may indicate a distortion in the baseband related to the undesired signal component. For example, if the radio frequency signal 101 comprises only the undesired signal component during the first time period, the auxiliary baseband signal 102 contains only signal components related to the undesired signal component of the radio frequency signal 101.

During a second time period, the local oscillator 110 generates a second local oscillator signal 112 having a frequency related to a frequency of the desired signal component of the radio frequency signal 101. For example, if desired signal component is a modulated signal, the frequency of the second local oscillator signal 112 may be equal or similar to a carrier frequency of the desired signal component of the radio frequency signal 101.

The mixer 120 generates the baseband receive signal 103 using the radio frequency signal 101 and the second local oscillator signal 112. For example, the mixer 120 may use the second local oscillator signal 112 to down-mix the radio frequency signal 101 to the baseband receive signal 103. The baseband receive signal 103 contains signal components related to the desired signal component of the radio frequency signal 101. Furthermore, the baseband receive signal 103 may contain a distortion component related to the undesired component of the radio frequency signal 101. A SNR of the baseband receive signal 103 may be reduced due to the distortion component within the baseband receive signal 103 compared to an ideal baseband receive signal derived from a radio frequency signal not containing any undesired signal components.

For example, the distortion component may be a modulated spur. A modulated spur may be generated by the mixer 120 when in addition to the second local oscillator signal 112 an additional (spurious) signal component with a frequency equal or similar to a frequency of the undesired signal component is applied to an input of the mixer 120. The spurious signal component may down-mix the undesired signal component of the radio frequency signal to the baseband. The down-mixed undesired signal component may overlap with the down-mixed desired signal component in the baseband receive signal 103, so that the SNR of the baseband receive signal 103 may degrade.

The distortion component may further be a second order IMD. Signal components having a frequency related to the sum or the difference of frequencies of the desired signal component and the undesired signal component of the radio frequency signal 101 input to the mixer 120 may be generated in the baseband receive signal 103 by the mixer 120. The unwanted signal components within the baseband receive signal 103 may result from a non-linearity of the mixer 120. Accordingly, the SNR of the baseband receive signal 103 may degrade.

The distortion component may, for example, further be related to a blocker signal contained in the radio frequency signal 101. The blocker signal may be a signal component of the radio frequency signal 101 (input to the mixer 120) having frequencies close to frequencies of the desired signal component. Furthermore, a signal power of the blocker signal may be comparatively high (e.g. the signal power of the blocker signal may be higher than a signal power of the desired signal component). By down-mixing the blocker signal, the mixer 120 may generate distorting signal components in the baseband receive signal 103, so that the SNR of the baseband receive signal 103 may degrade.

The receiver 100 reduces the distortion component in the baseband receive signal 103 by modifying the baseband receive signal 103 based on the auxiliary baseband signal 102. Accordingly, a corrected baseband receive signal 104 may be provided by the receiver 100. The receiver 100 may reduce or almost or completely mitigate the distortion component related to the undesired signal component in the corrected baseband receive signal 104. For example, the receiver 100 may modify an amplitude, a phase or both of the baseband receive signal 103 based on the auxiliary baseband signal 102 in order to generate the corrected baseband receive signal 104. In some examples, the receiver 100 may filter the baseband receive signal 103 using filter coefficients which are based on the auxiliary baseband signal 102. In some examples, the receiver 100 may subtract a correction signal based on the auxiliary baseband signal 102 from the baseband receive signal 103 in order to generate the corrected baseband receive signal 104. In some examples, the receiver 100 may further provide the auxiliary baseband signal 102 or information on the auxiliary baseband signal 102 to subsequent baseband processing units, so that the baseband processing units may adapt their configuration based on the given information. A SNR of the corrected baseband receive signal 104 may be increased compared to the baseband receive signal 103.

In some examples (e.g. for a transceiver comprising the receiver), the undesired signal component may be related to a baseband transmit signal. For example, a radio frequency transmit signal (generated from the baseband transmit signal) may leak into the receiver 100. The receiver 100 may comprises a filter configured to filter the baseband transmit signal using a configurable transfer function to generate a modified baseband transmit signal. The configurable transfer function may be based on the auxiliary baseband signal. The receiver may further comprises a combiner configured to combine the baseband receive signal and the modified baseband transmit signal. For example, the combiner may linearly combine the modified baseband transmit signal and the baseband receive signal (e.g. subtract the modified baseband transmit signal from the baseband receive signal). By adapting the configurable transfer function of the filter, the filter may generate a (almost ideal) replica of the auxiliary baseband signal from the baseband transmit signal. In other words, the configurable transfer function of the filter may be adapted such that it imitates a transfer characteristic of a channel providing the leaked radio frequency transmit signal to the receiver (e.g. a transfer characteristic of at least parts of the transmit path providing the radio frequency transmit signal, and a duplexer to which the transmit path and the receiver are connected to).

In some examples, the receiver 100 may further comprise a correlation unit configured to correlate the modified baseband transmit signal and the auxiliary baseband signal, wherein the filter is further configured to adapt the configurable transfer function based on a correlation result. By correlating the modified baseband transmit signal and the auxiliary baseband signal (e.g. by determining a difference between both signals), and adapting the configurable transfer function based on the correlation result (e.g. the difference between both signals), the configurable transfer function may be adapted such that it generates a (almost ideal) replica of the auxiliary baseband signal from the baseband transmit signal.

The correlation unit may be configured to iteratively correlate the modified baseband transmit signal and the auxiliary baseband signal, and the filter may be configured to iteratively adapt the configurable transfer function based on the correlation result until the correlation result satisfies a quality criterion. By iteratively carrying out the above processing, the adaption of the configurable transfer function to the actual transfer characteristic of the channel providing the leaked radio frequency transmit signal to the receiver may be enhanced.

The receiver 100 may comprise one or more additional optional features corresponding to one or more aspects of the proposed concept or one or more examples described below.

Generally speaking, some examples relate to a means for reducing a distortion component within a baseband receive signal derived from a radio frequency signal, wherein the distortion component is related to an undesired signal component of the radio frequency signal. The means comprises a means for generating, during a first time period, a first local oscillator signal having a frequency related to a frequency of the undesired signal component and a means for generating an auxiliary baseband signal using the radio frequency signal and the first local oscillator signal. The means for generating, during the first time period, the first local oscillator signal is configured to generate, during a different second time period, a second local oscillator signal having a frequency related to a frequency of a desired signal component of the radio frequency signal. The means for generating the auxiliary baseband signal is configured to generate the baseband receive signal using the radio frequency signal and the second local oscillator signal. The means for reducing the distortion component is configured to modify the baseband receive signal based on the auxiliary baseband signal. The undesired signal component may be related to a baseband transmit signal, wherein the means for reducing the distortion component may further comprise a means for filtering the baseband transmit signal using a configurable transfer function to generate a modified baseband transmit signal, the configurable transfer function being based on the auxiliary baseband signal, and a means for combining the baseband receive signal and the modified baseband transmit signal.

The means for reducing a distortion component may be implemented by a receiver for reducing a distortion component described above or below (e.g. FIG. 1). The means for means for generating, during a first time period, a first local oscillator signal may be implemented by a local oscillator described above or below (e.g. FIG. 1). The means for generating an auxiliary baseband signal may be implemented by a mixer described above or below (e.g. FIG. 1). The means for filtering the baseband transmit signal may be implemented by a filter described above or below (e.g. FIG. 1). The means for combining the baseband receive signal and the modified baseband transmit signal may be implemented by a combiner described above or below (e.g. FIG. 1).

Figure 2:
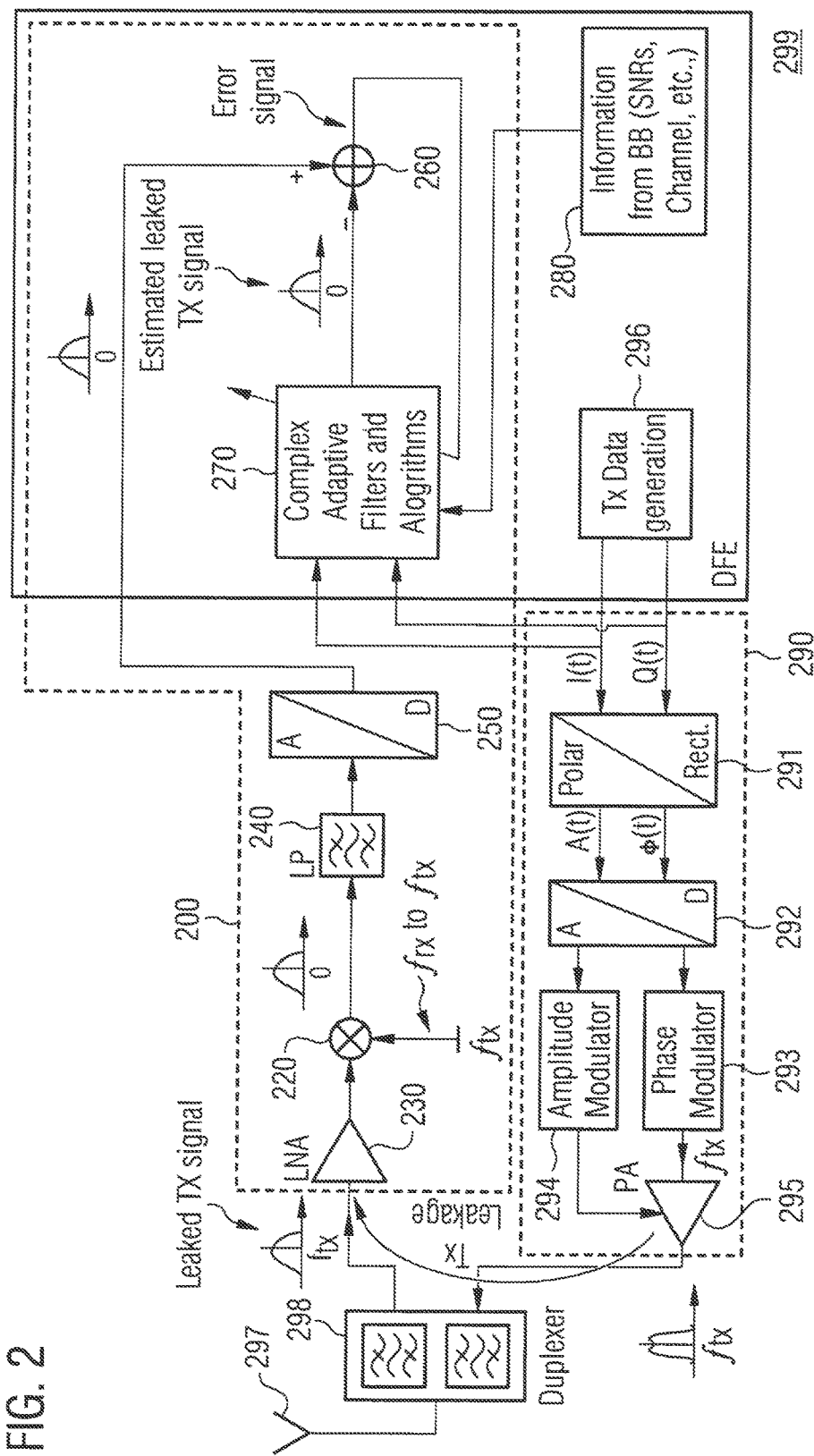
FIG. 2 illustrates an example of a transceiver comprising a receiver for reducing a distortion component within a baseband receive signal in a training mode.

FIG. 2 illustrates an example of a transceiver 299 comprising a receiver 200 for reducing a distortion component within a baseband receive signal assuming that the distortion component is related to leakage of a transmit signal into the receive receiver 200. In the example illustrated in FIG. 2, the receiver 200 is operated in a training mode as explained below.

The transceiver 299 further comprises a transmitter 290. A baseband transmit signal is provided to the transmitter 290 by baseband transmit data provision unit 296 (e.g. the baseband transmit data provision unit 296 may be part of a Digital Front-End (DFE) for baseband processing). For example, the baseband transmit signal may be provided in Cartesian representation, i.e., as data having an in-phase (I) component and a quadrature (Q) component, to the transmitter 290. The transmitter 290 comprises a polar coordinate provider 291, e.g., a processing unit configured to execute a CORDIC algorithm (COordinate Rotation DIgital Computer) in order to convert the I/Q representation of the baseband transmit signal to a polar representation, i.e., as data having an amplitude (A) component and a phase (φ) component. Alternatively, the baseband transmit signal may be provided to the transmitter 290 in polar representation. The transmitter 290 further comprises a Digital-to-Analog Converter (DAC) 292 in order to convert the digital baseband transmit signal to an analog baseband transmit signal. The amplitude component and the phase component of the analog baseband transmit signal are fed to an amplitude modulator 294 and a phase modulator 293, respectively. The outputs of the amplitude modulator 294 and the phase modulator 293 are provided to a power amplifier 295 in order to generate a radio frequency transmit signal. The radio frequency transmit signal has a carrier frequency $f_{tx}$ which is modulated with the baseband transmit signal.

The radio frequency transmit signal is provided to a duplexer 298, which is connected to an antenna element 297, in order to radiate the radio frequency transmit signal to the environment.

Further connected to the duplexer 298 is the receiver 200. The receiver receives a radio frequency signal from the duplexer 298. The duplexer 298 should provide an adequate rejection of signal components related to transmission (e.g. originating from transmitter 290) within a frequency band for reception. However, the duplexer 298 may not provide infinite isolation between both frequency bands, so that part of the radio frequency transmit signal may leak into the frequency band for reception. Accordingly, the leaked radio frequency transmit signal (Leaked TX signal) may be provided to the receiver 200. Hence, the leaked radio frequency transmit signal may be considered as an undesired signal component of the radio frequency signal provided to the receiver. In the situation illustrated in FIG. 2, merely the leaked radio frequency transmit signal is provided to the receiver 200 as radio frequency signal. That is, the radio frequency signal provided to the receiver 200 comprises only an undesired signal component.

The receiver 200 comprises a Low Noise Amplifier (LNA) 230, which may amplify a possibly weak radio frequency signal while adding as little noise and distortion as possible to the signal. The amplified radio frequency signal is provided to a mixer 220. A first local oscillator signal having a frequency $f_{tx}$ is provided to an input of the mixer 220. During reception of the leaked radio frequency transmit signal, the frequency $f_{tx}$ of the first local oscillator signal is tuned to a frequency related to the leaked radio frequency transmit signal. For example, the frequency $f_{rx}$ of the first local oscillator signal is tuned to a carrier frequency of the leaked radio frequency transmit signal. Hence, in training mode, the mixer 220 is provided with a first local oscillator signal having a frequency $f_{rx}$ related to the undesired signal component of the received radio frequency signal instead of a local oscillator signal having a frequency f related to a desired signal component of the received radio frequency signal.

The mixer 220 uses the first local oscillator signal to down-mix the leaked radio frequency transmit signal to the baseband (BB). The analog down-mixed signal is filtered by a low-pass filter 240 and converted to a digital signal by an Analog-to-Digital Converter (ADC) 250 in order to provide a digital auxiliary baseband signal. The digital auxiliary baseband signal is provided to a correlation unit, e.g., an adder 260.

The receiver 200 further comprises a filter 270. The baseband transmit signal is provided to the filter 270. The filter 270 filters the baseband transmit signal using a configurable transfer function to provide a modified baseband transmit signal. The configurable transfer function is based on the auxiliary baseband signal. For example, the configurable transfer function may be adapted based on a correlation result of the correlation unit. As illustrated in FIG. 2, the modified baseband transmit signal may be subtracted from the auxiliary baseband signal. Accordingly, an error signal may be provided as correlation result to the filter 270.

In some examples, the correlation unit may iteratively correlate the modified baseband transmit signal and the auxiliary baseband signal. For example, the adder 260 may iteratively subtract the modified baseband signal from the auxiliary baseband signal. Furthermore, the filter 270 may iteratively adapt the configurable transfer function based on the correlation result. The correlation unit (e.g. adder 260) and the filter 270 may iteratively perform the above processing until the correlation result satisfies a quality criterion. For example, the error signal provided by the adder 260 may be below a predefined threshold value.

The configurable transfer function used by the filter 270 may, e.g., be a complex transfer function. For example, the filter 270 may use complex filter coefficients. Alternatively, the filter 270 may use a set of real filter coefficients which in combination provide a complex transfer behavior of the filter 270 (i.e. a complex transfer function). In some examples, the configurable transfer function may be a linear transfer function. In some examples, the configurable transfer function may be a non-linear transfer function. Linear transfer functions may provide a reduced complexity compared to non-linear transfer functions, whereas non-linear transfer functions may provide an enhanced set of possible transfer characteristics for the filter 270.

The configurable transfer function may further be adjusted based on information related to the baseband transmit signal. For example, a SNR of the baseband transmit signal or an intended transmit channel for the baseband transmit signal may be provided to the filter 270 by a baseband information provision unit 280.

By adapting the configurable transfer function of the filter 270, the filter 270 may generate a (almost ideal) replica of the auxiliary baseband signal from the baseband transmit signal. In other words, the configurable transfer function of the filter 270 is adapted such that it imitates a transfer characteristic of the channel providing the leaked radio frequency transmit signal to the receiver 200. That is, the configurable transfer function is adapted to the current transfer characteristics of, e.g., the power amplifier 295 or the duplexer 298.

Figure 3:
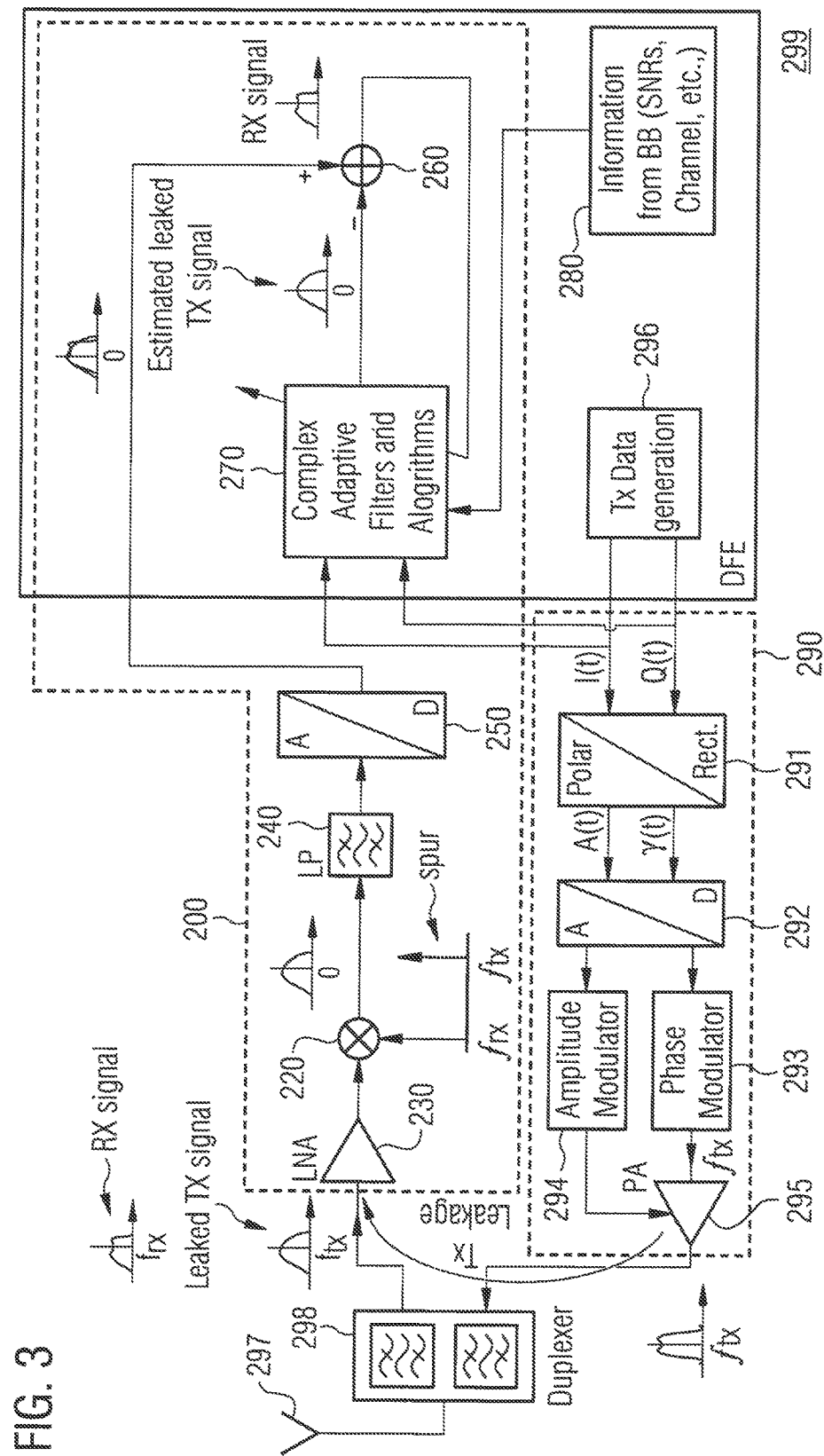
FIG. 3 illustrates the example of a transceiver illustrated in FIG. 2 in a cancellation mode.

The knowledge about the actual transfer characteristic of the channel providing the leaked radio frequency transmit signal to the receiver 200 is used by the receiver 200 in a cancellation mode in order to reduce distortion components in a baseband receive signal caused by the leaked radio frequency transmit signal. An operation of the receiver 200 in cancellation mode is illustrated in FIG. 3.

Similar to the situation illustrated in FIG. 2, the transmitter 290 provides the radio frequency transmit signal to the duplexer 298. Accordingly, the leaked radio frequency transmit signal is provided to the receiver 200. In addition, the transceiver 299 receives a radio frequency receive signal (RX signal) via the antenna 297 and provides it to the receiver 200 via the duplexer 298. Accordingly, the receiver 200 is provided with a radio frequency signal which comprises a desired signal component, i.e., the radio frequency receive signal, and an undesired signal component, i.e., the leaked radio frequency transmit signal.

The radio frequency signal is provided to the LNA 230 for amplification and the amplified signal is provided to the mixer 220. At a second input, the mixer 220 is provided with a second local oscillator signal having a frequency $f_{rx}$ which is related to a frequency of a desired signal component of the radio frequency signal. For example, the frequency $fr_x$ of the second local oscillator signal is tuned to a carrier frequency of the radio frequency receive signal. Accordingly, the radio frequency receive signal is down-mixed to the baseband by the mixer 220.

However, in addition to the second local oscillator signal, an additional signal component (spur) may be provided to the second input of the mixer 220. For example, the spur may be caused by an intermixing of frequencies generated within one or more other clock domains used within the transceiver 299. For example, a clock signal from a reference clock of the receiver 200 and a clock signal for the ADC 250 may intermix. In some examples, the additional signal component may have a frequency which is similar or equal to a carrier frequency $f_{rx}$ of the leaked radio frequency transmit signal, i.e., of the undesired signal component of the received radio frequency signal. Accordingly, the leaked radio frequency transmit signal is down-mixed to the baseband by the mixer 220 using the spur.

The analog baseband receive signal generated by the mixer 220 thus comprises a desired baseband component related to the radio frequency receive signal and a distortion component related to the leaked radio frequency transmit signal. Hence, the SNR of the analog baseband receive signal may be decreased due the distortion component.

The analog baseband receive signal is filtered by the low-pass filter 240 and converted to a digital signal by the ADC 250 in order to generate a digital baseband receive signal. The digital baseband receive signal is provided to a combiner, e.g., the adder 260. As illustrated in FIG. 2 and FIG. 3, the correlation unit used for the training mode and the combiner used for the cancellation mode may be implemented by a single processing unit (e.g. the adder 260). However, in some examples, the correlation unit and the combiner may be provided as separate entities within the receiver.

Further, a modified baseband signal is provided to the adder 260. The modified baseband transmit signal is based on the actual baseband transmit signal. The baseband transmit signal is provided to the filter 270 which filters the baseband transmit signal using the transfer function determined during the training mode. Hence, the transfer function of the filter 270 is adapted to the actual transfer characteristic of the channel providing the leaked radio frequency transmit signal to the receiver 200. Accordingly, the modified baseband transmit signal generated by the filter 270 may estimate the distortion component included in the baseband receive signal. In some examples, the modified baseband transmit signal may be a replica of the distortion component within the baseband receive signal.

The combiner, i.e., the adder 260 illustrated in FIG. 3, combines the baseband receive signal and the modified baseband transmit signal. In some examples, the combiner may linearly combine the baseband receive signal and the modified baseband transmit signal. For example, the adder 260 subtracts the modified baseband transmit signal from the baseband receive signal in order to provide a corrected baseband receive signal. For example, if the modified baseband transmit signal is a replica of the distortion component within the baseband receive signal, the corrected baseband receive signal may only comprise the desired baseband component, i.e., the baseband receive signal only comprises signal components related to the radio frequency receive signal.

In some examples, a combination result of the baseband receive signal and the modified auxiliary baseband signal is provided to the filter 270, so that the filter 270 may adapt the configurable transfer function based on the combination result. For example, the adder 260 may generate a further error signal indicating a difference between the baseband receive signal and the modified baseband transmit signal to the filter 270. Accordingly, the filter 270 may adapt the configurable transfer function to sudden changes of the transfer characteristic of the channel providing the leaked radio frequency transmit signal to the receiver 200.

The cancellation of the distortion component within the baseband receive signal is based on the derived information on the transfer characteristic of the channel providing the leaked radio frequency transmit signal to the receiver. Accordingly, no previously determined calibration values (e.g. from a factory calibration) are needed for cancellation. This may be advantageous since the previously determined calibration values describe a transfer characteristic at the time instant of the determination of the calibration values. However, the transfer characteristic of, e.g., the duplexer or the transmitter's power amplifier may change due to aging or varying environmental conditions (e.g. temperature). Hence, distortion components within the baseband receive signal may be mitigated more effectively since the distortion reduction is based on a real time estimation instead of pre-calibrated values.

In other words, when there is a requirement for calibration or distortion characterization of the channel (Duplexer, PA, etc.), the Tx (transmit) signal may be generated from the transmitter and the distorted leaked Tx signal may appear at the Rx mixer. This signal may be recovered in Rx-BB by tuning the Rx-LO to $f_{tx}$ during the time of the signal reception.

During the training phase, the distorted leaked Tx-signal may be received in Rx-BB by tuning the Rx-LO to $f_{tx}$. From the received signal, the distortion may be characterized by using complex adaptive filters (linear and/or non-linear) as the transmitted Tx-signal is known. The filter coefficients may adapt in such a way that an estimate of the leaked Tx-signal is produced out of the filter when the transmitted Tx-signal is passed through it. The filter coefficients may be updated using an adaptive signal processing algorithm that takes the feedback error signal (e.g. the difference between estimated and actual leaked Tx-signal) as an input. Since, in the training phase only the leaked Tx-signal may be present (i.e. no interferers), the filter coefficients may adapt and converge quite fast and accurate which is advantageous in situations where there is a strict timing requirement. Once the filter coefficients converge, the training phase may be finished and the Rx-LO mixer may be tuned back to $f_{rx}$. The cancellation phase may now be activated.

During the cancellation phase, both the Rx-signal and the leaked Tx-signal may get down converted in the Rx-BB by RX-LO mixer (tuned to $f_{rx}$) and a spur (occurring around $f_{tx}$), respectively. As the filter coefficients already converged, the adaptive filter block may output the estimate of the current leaked Tx-signal from the current generated Tx-signal. This estimated Tx-signal may be subtracted from the received signal (containing both Rx and leaked Tx-signal) so that it may produce only the Rx-BB signal. Since the feedback may further be present in the cancellation phase, the filter may adapt to sudden changes in the distortion parameters, thus enabling an active cancellation mechanism. As training and cancellation architecture is in the BB domain, the solution may be independent of the Tx and Rx operating frequencies. This concept may be highly flexible and configurable enabling performance on demand solution. The above solution can be more advantageous for CA mode. In intra-band CA mode, all the Rx-BB signals from the Rx-paths may be interfered by the same distorted Tx-modulated signal. Therefore, the training phase may be carried out with one of the Rx-paths (depending on which path is available for this usage), and the converged coefficients obtained from that path may be used for the cancellation of the interfering Tx-modulated signal in all the Rx-paths. Thus, leading to a less complex solution. Also, the training phase may be hopped from one Rx-path to other Rx-path providing a very flexible and convenient solution.

Since, the characteristic of the channel components like duplexer transfer function and PA nonlinearities may change over time, a set of factory calibrated values is not sufficient to cancel a modulated spur during the operation. It may be advantageous that the receiver does not require any factory calibrated values (i.e. prior knowledge of the channel characteristic is not needed). This concept may be activated from time to time to learn the channel during the operation, thus making it a time invariant channel. This kind of characterization may especially offer a better advantage during the digital cancellation phase.

Further, second order IMD products may be formed with the distorted leaked Tx signal, so that extracting the distorted leaked Tx modulated signal may be used to effectively characterize the second order IMD related distortion that has to be cancelled in BB. For example, this concept may be used to extract the distorted Tx signal from time to time.

The receiver 200 may comprise one or more additional optional features corresponding to one or more aspects of the proposed concept or one or more examples described above or below.

Figure 4:
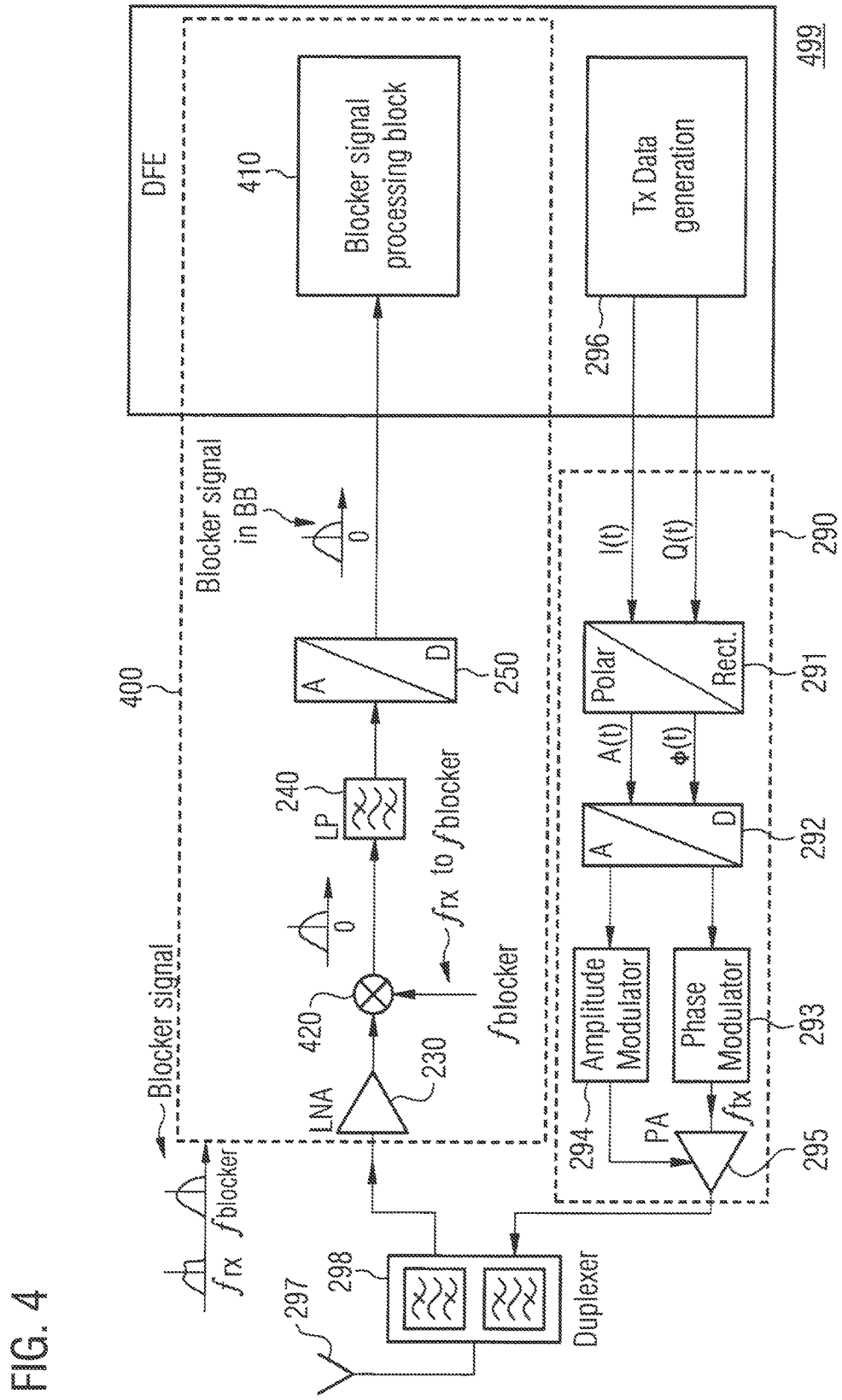
FIG. 4 illustrates another example of a transceiver comprising a receiver for reducing a distortion component within a baseband receive signal.

FIG. 4 illustrates another example of a transceiver 499 comprising a receiver 400 for reducing a distortion component within a baseband receive signal. The transceiver 499 comprises a transmitter 290 as describes above in connection with FIG. 2 and FIG. 3. The transmitter 290 is connected via a duplexer 298 to an antenna element 297. In the situation illustrated in FIG. 4, the transmitter 290 is inactive.

Further connected to the duplexer 298 is the receiver 400. A radio frequency signal is provide to the receiver 400 by the duplexer 298. The radio frequency signal comprises a radio frequency receive signal as desired signal component, and a blocker signal as undesired signal component. For example, the blocker signal may be a radio frequency signal emitted from another entity with a frequency which is close to a frequency of the radio frequency receive signal. For example, the blocker signal may be emitted on a transmission channel which is adjacent to the transmission channel of the radio frequency receive signal. The blocker signal may have a signal power which is greater than a signal power of the radio frequency receive signal.

The radio frequency signal containing the desired signal component and the undesired signal component is provided to the LNA 230 of the receiver 200. The LNA 230 amplifies the radio frequency signal and provides it to mixer 420. A first local oscillator signal is provided to the mixer 420. The first local oscillator signal has a frequency which is related to a frequency $f_{blocker}$ of the blocker signal. For example, if the blocker signal is modulated signal, the frequency of the first local oscillator signal may be tuned to a carrier frequency of the blocker signal. The mixer 420 down-mixes the blocker signal to the baseband using the first local oscillator signal in order to generate an analog auxiliary baseband signal.

The analog auxiliary baseband signal is filtered by the low-pass filter 240 and converted to a digital signal by the ADC 250 in order to generate a digital auxiliary baseband signal. The digital auxiliary baseband signal is provided to signal processing unit 410.

The signal processing unit 410 determines characteristics of the auxiliary baseband signal. The receiver 400 uses the determined characteristics to reduce distortion components related to the blocker signal in a baseband receive signal.

The baseband receive signal is provided by providing, instead of the first local oscillator signal, a second local oscillator frequency to the mixer 420. The second local oscillator signal has a frequency $f_{rx}$ which is related to a frequency of the radio frequency receive signal, i.e., to the desired signal component of the radio frequency signal. The radio frequency signal is down-mixed by the mixer 420 to the baseband receive signal using the second local oscillator signal. The baseband receive signal contains a desired baseband component related to the radio frequency receive signal and may further comprise a distortion component related to the blocker signal. The previously determined characteristics of the auxiliary baseband signal is used by the signal processing unit 410 or any other baseband processing unit to modify the baseband receive signal. For example, an amplitude, a phase or both of the baseband receive signal may be modified based on the previously determined characteristics of the auxiliary baseband signal. Accordingly, the distortion component within the baseband receive signal may be reduced.

In some examples, the previously determined characteristics of the auxiliary baseband signal may further be used to adjust analog components of the receiver 400. For example, a bias voltage of the ADC 250 may be adjusted based on the previously determined characteristics of the auxiliary baseband signal.

In other words, it may be advantageous to have knowledge of a blocker signal appearing around the Rx signal. By using this concept, the blocker signal may be recovered in BB by tuning the Rx-LO frequency to $f_{blocker}$ during the reception of the blocker signal. Once the blocker signal is extracted, the BB or DFE may use the information to adjust some of the component parameters.

The receiver 400 may comprise one or more additional optional features corresponding to one or more aspects of the proposed concept or one or more examples described above or below.

Figure 5:
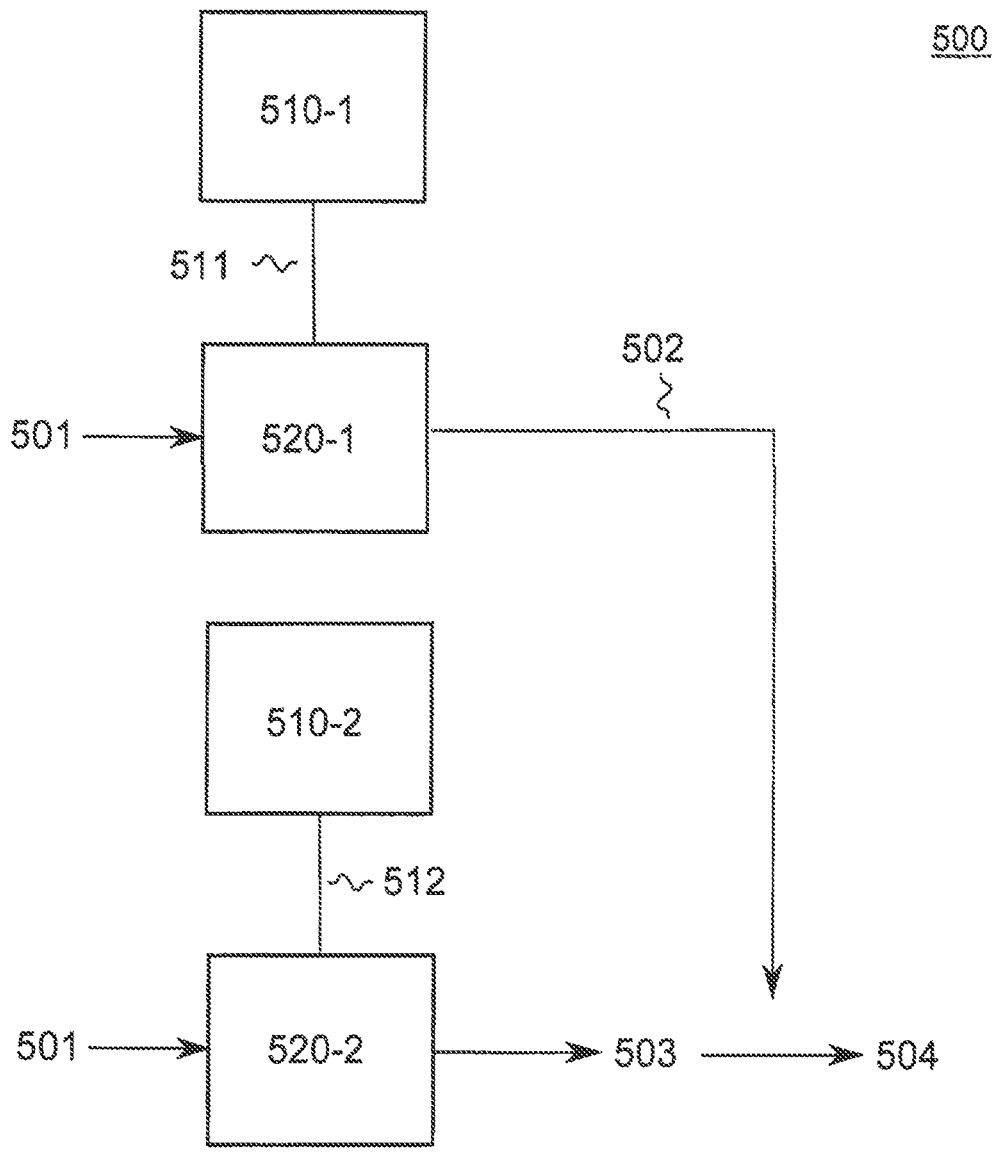
FIG. 5 illustrates another example of a receiver for reducing a distortion component within a baseband receive signal.

FIG. 5 illustrates another example of a receiver 500 for reducing a distortion component within a baseband receive signal 503 derived from a radio frequency signal 501, which is received by the receiver 500.

The radio frequency signal 501 comprises an undesired signal component and a desired signal component. For example, the radio frequency signal 501 may comprise the undesired signal component and the desired signal component at a same instant.

The receiver 500 comprises a first local oscillator 510-1. The first local oscillator 510-1 generates a first local oscillator signal 511. The first local oscillator signal 511 has a frequency which is related to a frequency of the undesired signal component. For example, if the radio frequency signal 501 is a modulated signal, the frequency of the first local oscillator signal 511 may be equal or similar to a carrier frequency of the undesired signal component of the radio frequency signal 501.

A first mixer 520-1 generates the auxiliary baseband signal 502 using the radio frequency signal 501 and the first local oscillator signal 511. For example, the first mixer 520-1 uses the radio first local oscillator signal 511 to down-mix the radio frequency signal 501 to the auxiliary baseband signal 502. The auxiliary baseband signal 502 is related to the undesired signal component of the radio frequency signal 501 and may indicate a distortion in the baseband related to the undesired signal component.

A second local oscillator 510-2 generates a second local oscillator signal 512 having a frequency related to a frequency of the desired signal component of the radio frequency signal 501. For example, if the radio frequency signal 501 is a modulated signal, the frequency of the second local oscillator signal 512 may be equal or similar to a carrier frequency of the desired signal component of the radio frequency signal 501.

A second mixer 520-2 generates the baseband receive signal 503 using the radio frequency signal 501 and the second local oscillator signal 512. For example, the second mixer 520-2 uses the second local oscillator signal 512 to down-mix the radio frequency signal 501 to the baseband receive signal 503. The baseband receive signal 503 contains signal components related to the desired signal component of the radio frequency signal 501. Furthermore, the baseband receive signal 503 may contain distortion components related to the undesired component of the radio frequency signal 501.

As discussed in connection with, e.g., FIG. 1, the distortion component may be a modulated spur, a second order IMD or may be related to a blocker signal. The distortion component may degrade a SNR of the baseband receive signal 503 compared to an ideal baseband receive signal derived from a radio frequency signal not containing any undesired signal components.

The receiver 500 reduces the distortion component in the baseband receive signal 503 by modifying the baseband receive signal 503 based on the auxiliary baseband signal 502. Accordingly, a corrected baseband receive signal 504 may be generated by the receiver 500. The receiver 500 may reduce or almost or completely mitigate the distortion component related to the undesired signal component in the corrected baseband receive signal 504. For example, the receiver 500 may modify the baseband receive signal 503 according to one or more of the examples given above or below in order to generate the corrected baseband receive signal 504. In some examples, the receiver 500 may further provide the auxiliary baseband signal 502 or information on the auxiliary baseband signal 502 to subsequent baseband processing units, so that the baseband processing units may adapt their configuration based on the given information. A SNR of the corrected baseband receive signal 504 may be increased compared to the baseband receive signal 503.

The receiver 500 may comprise one or more additional optional features corresponding to one or more aspects of the proposed concept or one or more examples described above or below.

Generally speaking, some examples relate to a means for reducing a distortion component within a baseband receive signal derived from a radio frequency signal, wherein the distortion component is related to an undesired signal component of the radio frequency signal. The means comprises a means generating a first local oscillator signal having a frequency related to a frequency of the undesired signal component and a means for generating an auxiliary baseband signal using the radio frequency signal and the first local oscillator signal. Further, the means for reducing the distortion component comprises a means for generating a second local oscillator signal having a frequency related to a frequency of a desired signal component of the radio frequency signal and a means for generating the baseband receive signal using the radio frequency signal and the second local oscillator signal. The means for reducing the distortion component is configured to modify the baseband receive signal based on the auxiliary baseband signal. The undesired signal component may be related to a baseband transmit signal, wherein the means for reducing the distortion component may further comprise a means for filtering the baseband transmit signal using a configurable transfer function to generate a modified baseband transmit signal, the configurable transfer function being based on the auxiliary baseband signal, and a means for combining the baseband receive signal and the modified baseband transmit signal.

The means for means for reducing the distortion component may be implemented by a receiver for reducing a distortion component described above or below (e.g. FIG. 5). The means for means generating a first local oscillator signal may be implemented by a first local oscillator described above or below (e.g. FIG. 5). The means for means for generating an auxiliary baseband signal may be implemented by a first mixer described above or below (e.g. FIG. 5). The means for means generating a second local oscillator signal may be implemented by a second local oscillator described above or below (e.g. FIG. 5). The means for means for providing the baseband receive signal may be implemented by a second mixer described above or below (e.g. FIG. 5). The means for filtering the baseband transmit signal may be implemented by a filter described above or below (e.g. FIG. 5). The means for combining the baseband receive signal and the modified baseband transmit signal may be implemented by a combiner described above or below (e.g. FIG. 5).

Figure 6:
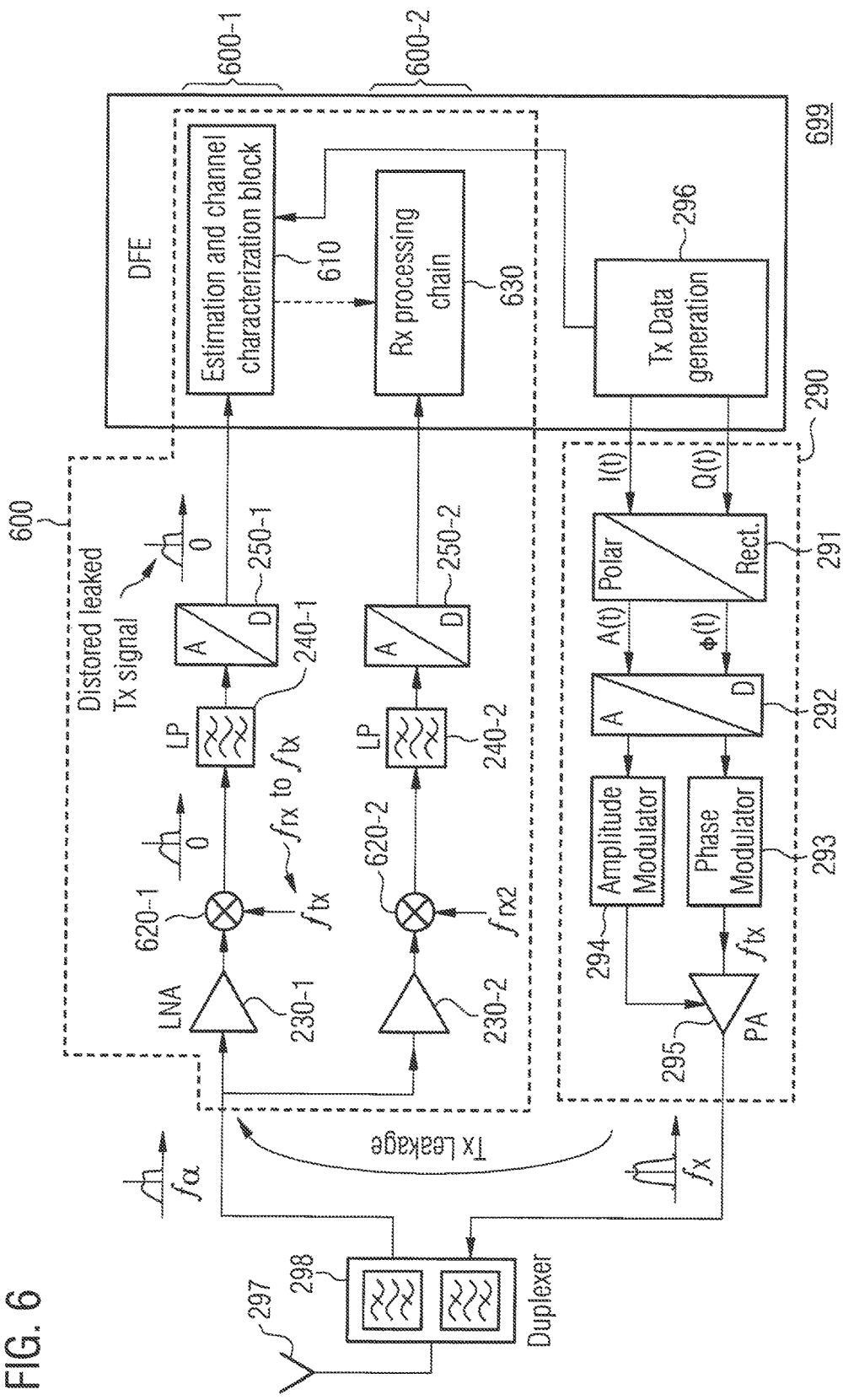
FIG. 6 illustrates another example of a transceiver comprising a receiver for reducing a distortion component within a baseband receive signal for an application using carrier aggregation.

FIG. 6 illustrates another example of a transceiver 699 comprising a receiver 600 for reducing a distortion component within a baseband receive signal. The transceiver 699 comprises a transmitter 290 as describes above in connection with FIG. 2 and FIG. 3. The transmitter 290 is connected via a duplexer 298 to an antenna element 297. The transmitter 290 provides a radio frequency transmit signal to the duplexer 298.

Further connected to the duplexer 298 is the receiver 600. The receiver 600 comprises a first receive path 600-1 and a second receive path 600-2. Both receive paths 600-1, 600-2 may be operated independently from each other. For example, the receiver 600 may be operated in an intra-band carrier aggregation mode. That is, the first receive path 600-1 may be operated to receive a first component carrier within a receive frequency band and the second receive path 600-2 may be operated to receive a second component carrier within the receive frequency band. That is, both receive paths 600-1, 600-2 receive component carriers within the same receive frequency band.

A radio frequency signal is provided to the receiver 600 by the duplexer 298. Similar to the situation illustrated in FIG. 2 and FIG. 3, the radio frequency signal may comprise, in addition to a desired radio frequency receive signal, a leaked radio frequency transmit signal due to the finite isolation of the duplexer 298 between the frequency band used for transmission and the receive frequency band. For example, the receive frequency band may be LTE band 3. Since both receive paths 600-1, 600-2 receive radio frequency signals within the same frequency band, the same leaked radio frequency transmit signal is received by both receive paths 600-1, 600-2. Accordingly, the distortion component caused by the leaked radio frequency transmit signal may be almost identical in the baseband receive signal generated by the first receive path 600-1 and the baseband receive signal provided by the second receive path 600-2.

Accordingly, one of the two receive paths 600-1, 600-2 may characterize the distortion component in its baseband receive signal and determine settings for distortion cancellation. The determined settings may be provided to the other receive path, so that only one of the two receive paths needs to perform distortion characterization.

For example, the first receive path 600-1 may determine the distortion caused by the leaked radio frequency transmit signal. Therefore, the first receive path 600-1 provides a first local oscillator signal having a frequency $f_{tx}$ (related to a frequency of the leaked radio frequency transmit signal) to its first mixer 620-1 to generate an auxiliary baseband signal. The auxiliary baseband signal is provided to a signal processing unit 610 to characterize the auxiliary baseband signal and determine settings for distortion cancellation. For example, the signal processing unit 610 may comprise a filter and a correlation unit similar to the receiver 200 illustrated in FIG. 2. Accordingly, a configurable transfer function of the filter may be adapted using the auxiliary baseband signal and the baseband transmit signal provided by baseband transmit data provision unit 296.

The configurable transfer function determined by the signal processing unit 610 may be provided to the receive signal processing unit 630 of the second receive path 600-2. The receive signal processing unit 630 may use the determined configurable transfer function to reduce a distortion component within a baseband signal generated by the mixer 620-2 of the second receive path 600-2 using a second oscillator signal related to a frequency of the radio frequency receive signal. Accordingly, the second receive path 600-2 is not required to determine settings (e.g. the configurable transfer function) for reducing the distortion component within its baseband receive signal.

In general, for a receiver containing multiple receive paths, one of the receive paths may characterize the distortion component and determine adequate settings for reducing the distortion component. The characterization of the distortion component and/or the determined settings for reducing the distortion component may be provided to one or more of the other receive paths.

In other words, a leaked Tx modulated signal may be extracted in Rx baseband by starting with the single receiver mode and tuning the LO of the second Rx-path to $f_{tx}$. The received leaked signal may be used to estimate the distortion of the Tx-signal. Once the characterization of the distortion is done, the Rx-LO oscillator may be re-tuned to $f_{rx}$ and then operated in a normal carrier aggregation mode (Rx-CA). When the transceiver is operating in intra-band CA mode, the Tx-signal distortion may be identical for both Rx-paths. Therefore, the distortion estimation in one path may be effectively used to mitigate the modulated spur problem in all the other Rx-paths. Thus, this concept may provide a flexible and effective way for mitigating the modulated spurs in CA mode.

The receiver 600 may comprise one or more additional optional features corresponding to one or more aspects of the proposed concept or one or more examples described above or below.

In the foregoing description, it was assumed that only one transmit path is present in a transceiver. However, a transceiver may comprise multiple transmit paths which are connected to a duplexer (i.e. the transceiver provides multiple uplink paths). Accordingly, multiple radio frequency transmit signals may leak into the radio frequency signal provided to receiver by the duplexer. Hence, a distortion component may be caused in a baseband receive signal which depends on the multiple leaked radio frequency transmit signals. Accordingly, a receiver for reducing a distortion component within a baseband receive signal according to the proposed concept may consider all or at least part of the multiple transmit signals for reducing the distortion component within the baseband receive signal.

Figure 7:
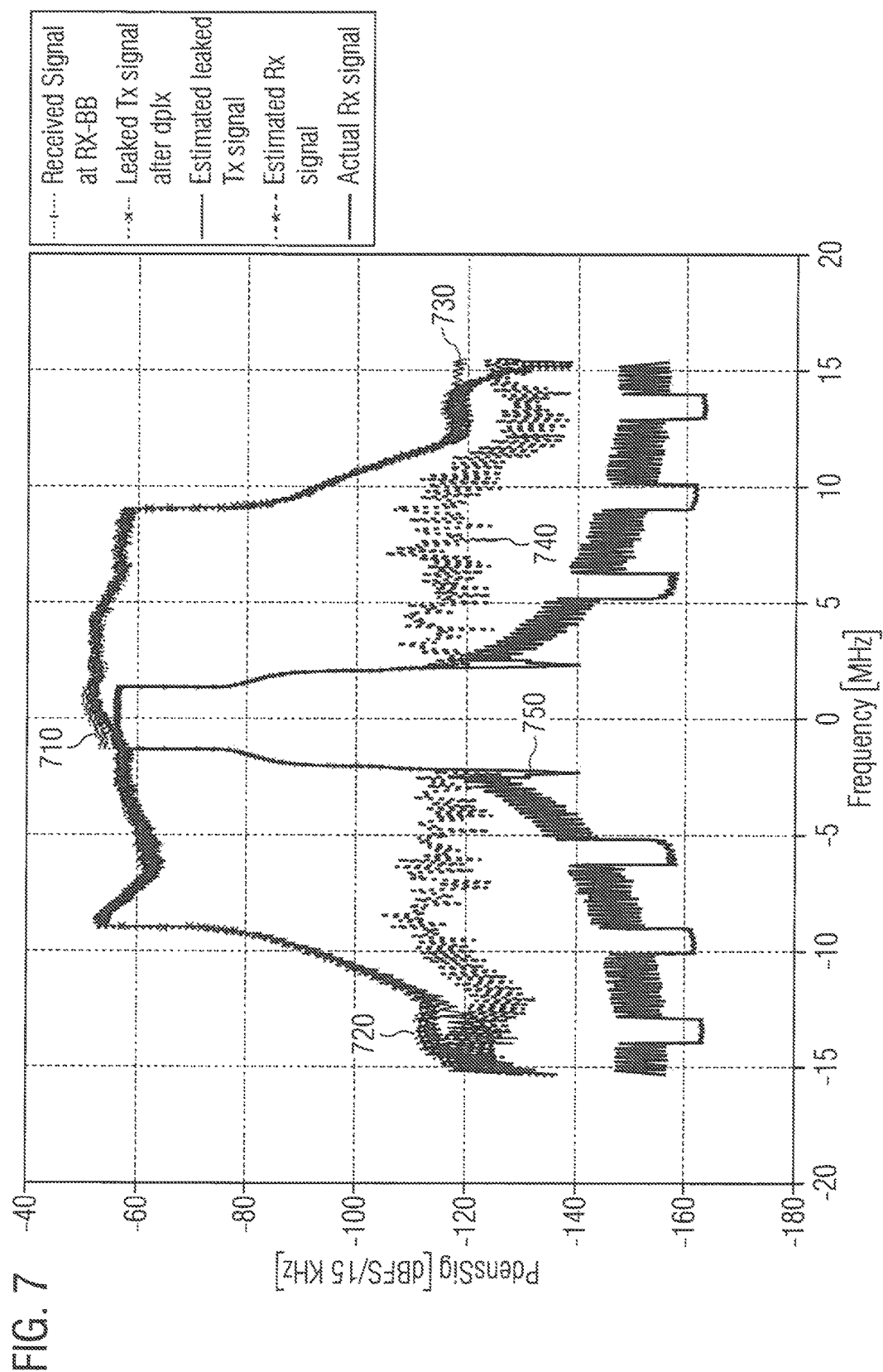
FIG. 7 illustrates examples of various signals used within a receiver for reducing a distortion component within a baseband receive signal.

FIG. 7 illustrates a diagram including examples of a variety of signals used within a receiver according to an example described herein. The abscissa of the diagram denotes a frequency of a signal in megahertz (MHz). The ordinate denotes a signal power of a signal in Decibel full scale (DBFs).

An example of radio frequency signal 710 received by a receiver according to an example described herein is mostly dominated by a leaked radio frequency transmit signal 720. As a reference, an estimated leaked radio frequency transmit signal 730 is illustrated. The estimated leaked radio frequency transmit signal 730 is based on the characterization of the distortion component by the receiver. It is obvious from FIG. 7 that the estimation 730 is almost a perfect replica of the actual leaked radio frequency transmit signal 720. Accordingly, the receiver is able to model the channel providing the leaked radio frequency transmit signal 720 to it.

FIG. 7 further illustrates an example of a corrected baseband receive signal 740. The corrected baseband receive signal 740 is generated by the receiver by modifying the baseband receive signal according to one or more aspects of the proposed concept. As a reference, an ideal baseband receive signal 750 is illustrated. The ideal baseband receive signal is the baseband signal that is provided by the receiver if received the radio frequency signal does not comprise the leaked radio frequency transmit signal 720. It is obvious from FIG. 7, that the corrected baseband receive signal 740 models very well the signal shape of the ideal baseband receive signal 750 (apart from a slightly different noise level).

Hence, FIG. 7 illustrates that the proposed concept may reduce (mitigate) a distortion component in a baseband receive signal which is related to an undesired signal component in a received radio frequency signal.

Figure 8:
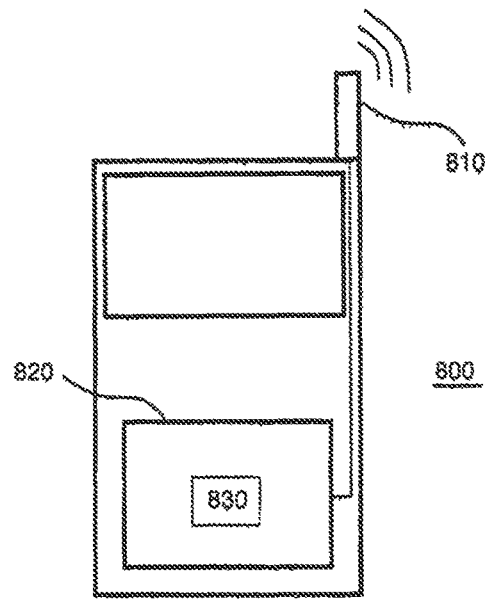
FIG. 8 illustrates an example of a mobile communications device comprising a receiver for reducing a distortion component within a baseband receive signal.

An example of an implementation using distortion component reduction within a baseband receive signal according to one or more aspects of the proposed concept or one or more examples described above is illustrated in FIG. 8. FIG. 8 schematically illustrates an example of a mobile communications device or mobile phone or user equipment 800 comprising a receiver 830 for reducing a distortion component within a baseband receive signal according to an example described herein. The receiver 830 may be comprised in a transceiver 820 (e.g. according to an example described herein). An antenna element 810 of the mobile communications device 800 may be coupled to the transceiver 820. To this end, mobile communications devices may be provided allowing relaxed specifications for analog components (e.g. duplexer) of the transceiver. Furthermore, new LTE band combinations for carrier aggregation may be used for a mobile communications device according to examples described herein.

Figure 9:
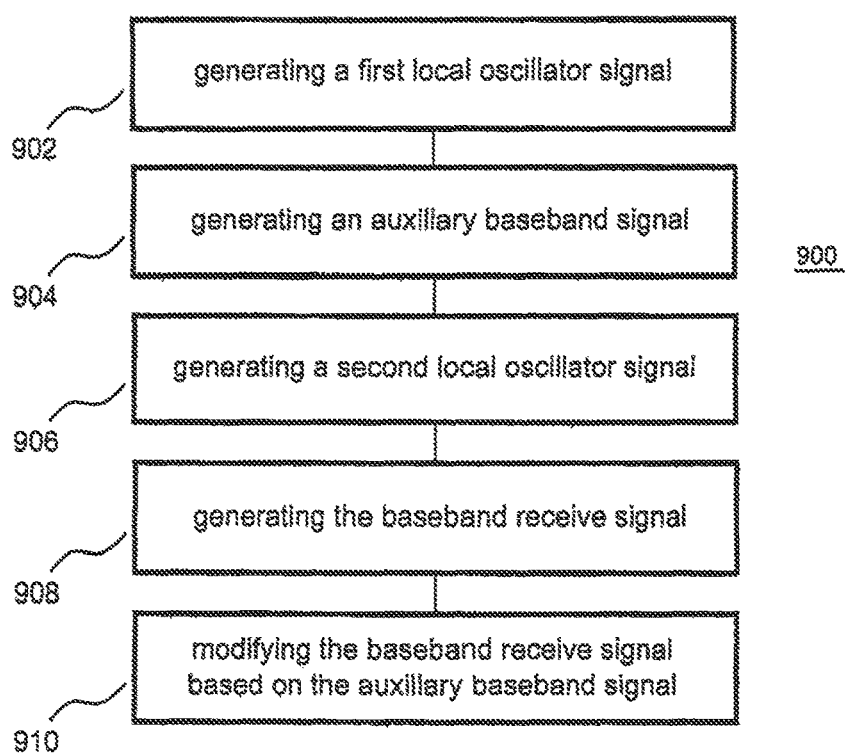
FIG. 9 illustrates a flowchart of an example of a method for reducing a distortion component within a baseband receive signal.

An example of a method 900 for reducing a distortion component within a baseband receive signal is illustrated by means of a flowchart in FIG. 9. The baseband receive signal is derived from a radio frequency signal and the distortion component is related to an undesired signal component of the radio frequency signal. The method comprises generating 902 a first local oscillator signal having a frequency related to a frequency of the undesired signal component. Further the method comprises generating 904 an auxiliary baseband signal using the radio frequency signal and the first local oscillator signal. The method further comprises generating 906 a second local oscillator signal having a frequency related to a frequency of a desired signal component of the radio frequency signal. Further the method comprises generating 908 the baseband receive signal using the radio frequency signal and the second local oscillator signal. The method comprises modifying 910 the baseband receive signal based on the auxiliary baseband signal.

More details and aspects of the method are mentioned in connection with the proposed concept or one or more examples described above (e.g. FIGS. 1-8). The method may comprise one or more additional optional features corresponding to one or more aspects of the proposed concept or one or more examples described above.

The examples as described herein may be summarized as follows:

Example 1 is a receiver for reducing a distortion component within a baseband receive signal derived from a radio frequency signal, the distortion component being related to an undesired signal component of the radio frequency signal, comprising: a first local oscillator configured to generate a first local oscillator signal having a frequency related to a frequency of the undesired signal component; a first mixer configured to generate an auxiliary baseband signal using the radio frequency signal and the first local oscillator signal; a second local oscillator configured to generate a second local oscillator signal having a frequency related to a frequency of a desired signal component of the radio frequency signal; and a second mixer configured to generate the baseband receive signal using the radio frequency signal and the second local oscillator signal, wherein the receiver is configured to modify the baseband receive signal based on the auxiliary baseband signal.

In example 2, the undesired signal component is related to a baseband transmit signal, and the receiver of example 1 further comprises: a filter configured to filter the baseband transmit signal using a configurable transfer function to generate a modified baseband transmit signal, the configurable transfer function being based on the auxiliary baseband signal; and a combiner configured to combine the baseband receive signal and the modified baseband transmit signal.

In example 3, the combiner in the receiver of example 2 is configured to linearly combine the modified baseband transmit signal and the baseband receive signal.

In example 4, the receiver example 2 or example 3 further comprises a correlation unit configured to correlate the modified baseband transmit signal and the auxiliary baseband signal, wherein the filter is further configured to adapt the configurable transfer function based on a correlation result.

In example 5, the correlation unit in the receiver of example 4 is configured to iteratively correlate the modified baseband transmit signal and the auxiliary baseband signal, and the filter is configured to iteratively adapt the configurable transfer function based on the correlation result until the correlation result satisfies a quality criterion.

In example 6, the filter in the receiver of any of examples 2 to 5 is further configured to adapt the configurable transfer function based on a combination result of the baseband receive signal and the modified auxiliary baseband signal.

In example 7, the configurable transfer function is a complex transfer function in the receiver of any of examples 2 to 6.

In example 8, the configurable transfer function is a linear transfer function in the receiver of any of examples 2 to 7.

In example 9, the configurable transfer functions is non-linear transfer function in the receiver of any of examples 2 to 7.

In example 10, the baseband receive signal is a digital signal, the baseband transmit signal is a digital signal, the auxiliary baseband signal is a digital signal, and the modified auxiliary baseband signal is a digital signal in the receiver of any of examples 2 to 9.

In example 11, the distortion component is a modulated spur in the receiver of any of examples 2 to 10.

In example 12, the distortion component is a second order intermodulation distortion in the receiver of any of examples 2 to 10.

In example 13, the undesired signal component is a blocker signal for the desired signal component in the receiver of example 1.

Example 14 is a receiver for reducing a distortion component within a baseband receive signal derived from a radio frequency signal, the distortion component being related to an undesired signal component of the radio frequency signal, comprising: a local oscillator configured to generate, during a first time period, a first local oscillator signal having a frequency related to a frequency of the undesired signal component of the radio frequency signal; and a mixer configured to generate an auxiliary baseband signal using the radio frequency signal and the first local oscillator signal, wherein the local oscillator is configured to generate, during a different second time period, a second local oscillator signal having a frequency related to a frequency of a desired signal component of the radio frequency signal, wherein the mixer is configured to generate the baseband receive signal using the radio frequency signal and the second local oscillator signal, and wherein the receiver is configured to modify the baseband receive signal based on the auxiliary baseband signal.

In example 15, the undesired signal component is related to a baseband transmit signal, and the receiver of example 14 further comprises: a filter configured to filter the baseband transmit signal using a configurable transfer function to generate a modified baseband transmit signal, the configurable transfer function being based on the auxiliary baseband signal; and a combiner configured to combine the baseband receive signal and the modified baseband transmit signal.

In example 16, the combiner in the receiver of example 15 is configured to linearly combine the modified baseband transmit signal and the baseband receive signal.

In example 17, the receiver of example 15 or example 16 further comprises a correlation unit configured to correlate the modified baseband transmit signal and the auxiliary baseband signal, wherein the filter is further configured to adapt the configurable transfer function based on a correlation result.

In example 18, the correlation unit in the receiver of example 17 is configured to iteratively correlate the modified baseband transmit signal and the auxiliary baseband signal, and the filter is configured to iteratively adapt the configurable transfer function based on the correlation result until the correlation result satisfies a quality criterion.

In example 19, the filter in the receiver of any of examples 15 to 18 is further configured to adapt the configurable transfer function based on a combination result of the baseband receive signal and the modified auxiliary baseband signal.

In example 20, the configurable transfer function is a complex transfer function in the receiver of any of examples 15 to 19.

In example 21, the configurable transfer function is a linear transfer function in the receiver of any of examples 15 to 20.

In example 22, the configurable transfer functions is non-linear transfer function in the receiver of any of examples 15 to 20.

In example 23, the baseband receive signal is a digital signal, the baseband transmit signal is a digital signal, the auxiliary baseband signal is a digital signal, and the modified auxiliary baseband signal is a digital signal in the receiver of any of examples 15 to 22.

In example 24, the distortion component is a modulated spur in the receiver of any of examples 15 to 23.

In example 25, the distortion component is a second order intermodulation distortion in the receiver of any of examples 15 to 23.

In example 26, the undesired signal component is a blocker signal for the desired signal component in the receiver of example 14.

Example 27 is a transceiver comprising a transmitter and a receiver according to any of examples 1 to 13 or a receiver according to any of examples 14 to 26.

In example 28, the transceiver of example 27 further comprises a duplexer coupled to the receiver and to the transmitter and configured to supply the radio frequency signal to the receiver.

Example 29 is a mobile communications device comprising a transceiver according to example 27 or example 28.

In example 30, the mobile communications device of example 29 further comprises at least one antenna element coupled to the transceiver.

Example 31 is a means for reducing a distortion component within a baseband receive signal derived from a radio frequency signal, the distortion component being related to an undesired signal component of the radio frequency signal, comprising: a means for generating, during a first time period, a first local oscillator signal having a frequency related to a frequency of the undesired signal component; and a means for generating an auxiliary baseband signal using the radio frequency signal and the first local oscillator signal, wherein the means for generating the first local oscillator signal is configured to generate, during a different second time period, a second local oscillator signal having a frequency related to a frequency of a desired signal component of the radio frequency signal, wherein the means for generating the auxiliary baseband signal is configured to generate the baseband receive signal using the radio frequency signal and the second local oscillator signal, and wherein the means for reducing the distortion component is configured to modify the baseband receive signal based on the auxiliary baseband signal.

In example 32, the undesired signal component is related to a baseband transmit signal, and the means for reducing the distortion component in the means of example 31 further comprises: a means for filtering the baseband transmit signal using a configurable transfer function to generate a modified baseband transmit signal, the configurable transfer function being based on the auxiliary baseband signal; and a means for combining the baseband receive signal and the modified baseband transmit signal.

Example 33 is a means for reducing a distortion component within a baseband receive signal derived from a radio frequency signal, the distortion component being related to an undesired signal component of the radio frequency signal, comprising: a means generating a first local oscillator signal having a frequency related to a frequency of the undesired signal component of the radio frequency signal; a means for generating an auxiliary baseband signal using the radio frequency signal and the first local oscillator signal; a means for generating a second local oscillator signal having a frequency related to a frequency of a desired signal component of the radio frequency signal; and a means for generating the baseband receive signal using the radio frequency signal and the second local oscillator signal, wherein the means for reducing the distortion component is configured to modify the baseband receive signal based on the auxiliary baseband signal.

In example 34, the undesired signal component is related to a baseband transmit signal, and the means for reducing the distortion component in the means of example 33 further comprises: a means for filtering the baseband transmit signal using a configurable transfer function to generate a modified baseband transmit signal, the configurable transfer function being based on the auxiliary baseband signal; and a means for combining the baseband receive signal and the modified baseband transmit signal.

Example 35 is a method for reducing a distortion component within a baseband receive signal derived from a radio frequency signal, the distortion component being related to an undesired signal component of the radio frequency signal, comprising: generating a first local oscillator signal having a frequency related to a frequency of the undesired signal component of the radio frequency signal; generating an auxiliary baseband signal using the radio frequency signal and the first local oscillator signal; generating a second local oscillator signal having a frequency related to a frequency of a desired signal component of the radio frequency signal; generating the baseband receive signal using the radio frequency signal and the second local oscillator signal; and modifying the baseband receive signal based on the auxiliary baseband signal.

In example 36, the undesired signal component is related to a baseband transmit signal, and modifying the baseband receive signal based on the auxiliary baseband signal in the method of example 35 comprises: filtering the baseband transmit signal using a configurable transfer function to generate a modified baseband transmit signal, the configurable transfer function being based on the auxiliary baseband signal; and combining the baseband receive signal and the modified baseband transmit signal.

In example 37, combining the baseband receive signal and the modified baseband transmit signal in the method of example 36 comprises a linear combination of the modified baseband transmit signal and the baseband receive signal.

In example 38, the method of example 36 or example 37 further comprises determining the configurable transfer function, the determining comprising: correlating the modified baseband transmit signal and the auxiliary baseband signal; and adapting the configurable transfer function based on a correlation result.

In example 39, the determining in the method of example 38 is carried out iteratively until the correlation result satisfies a quality criterion.

In example 40, the method of any of examples 36 to 39 further comprises adapting the configurable transfer function based on a combination result of the baseband receive signal and the modified auxiliary baseband signal.

In example 41, the configurable transfer function is a complex transfer function in the method of any of example 36 to 40.

In example 42, the configurable transfer function is a linear transfer function in the method of any of example 36 to 41.

In example 43, the configurable transfer functions is non-linear transfer function in the method of any of example 36 to 41.

In example 44, the baseband receive signal is a digital signal, the baseband transmit signal is a digital signal, the auxiliary baseband signal is a digital signal, and the modified auxiliary baseband signal is a digital signal in the method of any of example 36 to 43.

In example 45, first local oscillator signal is generated during a first time period and the second local oscillator signal is generated during a different second time period in the method of any of the preceding examples.

In example 46, the distortion component is a modulated spur in the method of any of example 36 to 45.

In example 47, the distortion component is a second order intermodulation distortion in the method of any of example 36 to 45.

In example 48, the undesired signal component is a blocker signal for the desired signal component in the method of example 35.

Example 49 is a computer readable storage medium having stored thereon a program having a program code for performing the method of any of examples 35 to 48, when the program is executed on a computer or processor.

Example 50 is a computer program having a program code configured to perform the method of any of examples 35 to 48, when the computer program is executed on a computer or processor.

Examples may further provide a computer program having a program code for performing one of the above methods, when the computer program is executed on a computer or processor. A person of skill in the art would readily recognize that steps of various above-described methods may be performed by programmed computers. Herein, some examples are also intended to cover program storage devices, e.g., digital data storage media, which are machine or computer readable and encode machine-executable or computer-executable programs of instructions, wherein the instructions perform some or all of the acts of the above-described methods. The program storage devices may be, e.g., digital memories, magnetic storage media such as magnetic disks and magnetic tapes, hard drives, or optically readable digital data storage media. Further examples are also intended to cover computers programmed to perform the acts of the above-described methods or (field) programmable logic arrays ((F)PLAs) or (field) programmable gate arrays ((F)PGAs), programmed to perform the acts of the above-described methods.

The description and drawings merely illustrate the principles of the disclosure. It will thus be appreciated that those skilled in the art will be able to devise various arrangements that, although not explicitly described or shown herein, embody the principles of the disclosure and are included within its spirit and scope. Furthermore, all examples recited herein are principally intended expressly to be only for pedagogical purposes to aid the reader in understanding the principles of the disclosure and the concepts contributed by the inventor(s) to furthering the art, and are to be construed as being without limitation to such specifically recited examples and conditions. Moreover, all statements herein reciting principles, aspects, and examples of the disclosure, as well as specific examples thereof, are intended to encompass equivalents thereof.

Functional blocks denoted as "means for . . . " (performing a certain function) shall be understood as functional blocks comprising circuitry that is configured to perform a certain function, respectively. Hence, a "means for s.th." may as well be understood as a "means configured to or suited for s.th.". A means configured to perform a certain function does, hence, not imply that such means necessarily is performing the function (at a given time instant).

Functions of various elements shown in the figures, including any functional blocks labeled as "means", "means for providing a sensor signal", "means for generating a transmit signal.", etc., may be provided through the use of dedicated hardware, such as "a signal provider", "a signal processing unit", "a processor", "a controller", etc. as well as hardware capable of executing software in association with appropriate software. Moreover, any entity described herein as "means", may correspond to or be implemented as "one or more modules", "one or more devices", "one or more units", etc. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included.

It should be appreciated by those skilled in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Furthermore, the following claims are hereby incorporated into the detailed description, where each claim may stand on its own as a separate example. While each claim may stand on its own as a separate example, it is to be noted that—although a dependent claim may refer in the claims to a specific combination with one or more other claims—other examples may also include a combination of the dependent claim with the subject matter of each other dependent or independent claim. Such combinations are proposed herein unless it is stated that a specific combination is not intended. Furthermore, it is intended to include also features of a claim to any other independent claim even if this claim is not directly made dependent to the independent claim.

It is further to be noted that methods disclosed in the specification or in the claims may be implemented by a device having means for performing each of the respective acts of these methods.

Further, it is to be understood that the disclosure of multiple acts or functions disclosed in the specification or claims may not be construed as to be within the specific order. Therefore, the disclosure of multiple acts or functions will not limit these to a particular order unless such acts or functions are not interchangeable for technical reasons. Furthermore, in some examples a single act may include or may be broken into multiple sub acts. Such sub acts may be included and part of the disclosure of this single act unless explicitly excluded.

What is claimed is:

1. A receiver for reducing a distortion within a baseband receive signal derived from a radio frequency signal, the distortion being related to first signal portion of the radio frequency signal, wherein the first signal portion is related to a baseband transmit signal, the receiver comprising:
   a first local oscillator configured to generate a first local oscillator signal having a frequency related to a frequency of the first signal portion;
   a first mixer configured to generate an auxiliary baseband signal using the radio frequency signal and the first local oscillator signal;
   a second local oscillator configured to generate a second local oscillator signal having a frequency related to a frequency of a second signal portion of the radio frequency signal;
   a second mixer configured to generate the baseband receive signal using the radio frequency signal and the second local oscillator signal;
   a filter configured to filter the baseband transmit signal using a configurable transfer function to generate a modified baseband transmit signal, the configurable transfer function being based on the auxiliary baseband signal; and
   a combiner configured to combine the baseband receive signal and the modified baseband transmit signal.

2. The receiver of claim 1, wherein the combiner is configured to linearly combine the modified baseband transmit signal and the baseband receive signal.

3. The receiver of claim 1, further comprising a correlation circuit configured to correlate the modified baseband transmit signal and the auxiliary baseband signal, wherein the filter is further configured to adapt the configurable transfer function based on a correlation result.

4. The receiver of claim 3, wherein the correlation circuit is configured to iteratively correlate the modified baseband transmit signal and the auxiliary baseband signal, and the filter is configured to iteratively adapt the configurable transfer function based on the correlation result until the correlation result satisfies a quality criterion.

5. The receiver of claim 1, wherein the filter is further configured to adapt the configurable transfer function based on a combination result of the baseband receive signal and the modified auxiliary baseband signal.

6. The receiver of claim 1, wherein the configurable transfer function is a complex transfer function.

7. A receiver for reducing a distortion within a baseband receive signal derived from a radio frequency signal, the distortion being related to first signal portion of the radio frequency signal, comprising:
- a local oscillator configured to generate, during a first time period, a first local oscillator signal having a frequency related to a frequency of the first signal portion of the radio frequency signal;
- a mixer configured to generate an auxiliary baseband signal using the radio frequency signal and the first local oscillator signal,
- wherein the local oscillator is configured to generate, during a different second time period, a second local oscillator signal having a frequency related to a frequency of a second signal portion of the radio frequency signal,
- wherein the mixer is configured to generate the baseband receive signal using the radio frequency signal and the second local oscillator signal,
wherein the receiver is configured to modify the baseband receive signal based on the auxiliary baseband signal, and
- wherein the first signal portion is related to a baseband transmit signal, and wherein the receiver further comprises: a filter configured to filter the baseband transmit signal using a configurable transfer function to generate a modified baseband transmit signal, the configurable transfer function being based on the auxiliary baseband signal; and
- a combiner configured to combine the baseband receive signal and the modified baseband transmit signal.

8. The receiver of claim 7, further comprising a correlation circuit writ configured to correlate the modified baseband transmit signal and the auxiliary baseband signal, wherein the filter is further configured to adapt the configurable transfer function based on a correlation result.

9. The receiver of claim 7, wherein the filter is further configured to adapt the configurable transfer function based on a combination result of the baseband receive signal and the modified auxiliary baseband signal.

10. A method for reducing a distortion within a baseband receive signal derived from a radio frequency signal, the distortion being related to a first signal portion of the radio frequency signal, wherein the first signal portion is related to a baseband transmit signal, the method comprising:
- generating a first local oscillator signal having a frequency related to a frequency of the first signal portion of the radio frequency signal;
- generating an auxiliary baseband signal using the radio frequency signal and the first local oscillator signal;
- generating a second local oscillator signal having a frequency related to a frequency of a second signal portion of the radio frequency signal;
- generating the baseband receive signal using the radio frequency signal and the second local oscillator signal; and
- modifying the baseband receive signal based on the auxiliary baseband signal, wherein modifying the baseband receive signal based on the auxiliary baseband signal comprises:
- filtering the baseband transmit signal using a configurable transfer function to generate a modified baseband transmit signal, the configurable transfer function being based on the auxiliary baseband signal; and
- combining the baseband receive signal and the modified baseband transmit signal.

11. The method of claim 10, wherein combining the baseband receive signal and the modified baseband transmit signal comprises a linear combination of the modified baseband transmit signal and the baseband receive signal.

12. The method of claim 10, further comprising determining the configurable transfer function, the determining comprising:
- correlating the modified baseband transmit signal and the auxiliary baseband signal; and
- adapting the configurable transfer function based on a correlation result.

13. The method of claim 12, wherein the determining is carried out iteratively until the correlation result satisfies a quality criterion.

14. The method of claim 10, wherein the method further comprises adapting the configurable transfer function based on a combination result of the baseband receive signal and the modified auxiliary baseband signal.

15. The method of claim 10, wherein the configurable transfer function is a complex transfer function.

16. The method of claim 10, wherein the configurable transfer function is a linear transfer function.

17. The method of claim 10, wherein the configurable transfer functions is non-linear transfer function.

18. The method of claim 10, wherein first local oscillator signal is generated during a first time period and the second local oscillator signal is generated during a different second time period.

19. The method of claim 10, wherein the distortion is a modulated spur.

20. The method of claim 10, wherein the distortion is a second order intermodulation distortion.

21. The method of claim 10, wherein the first signal portion is a blocker signal for the second signal portion.

22. A non-transitory computer readable storage medium having stored thereon a program having a program code for performing the method of claim 10, when the program is executed on a computer or processor.

* * * * *